United States Patent [19]
Takeda

[11] Patent Number: 5,103,218
[45] Date of Patent: Apr. 7, 1992

[54] SOURCE ELECTRODE DRIVING CIRCUIT FOR MATRIX TYPE LIQUID CRYSTAL DISPLAY APPARATUS

[75] Inventor: Makoto Takeda, Nara, Japan

[73] Assignee: Sharp Kabushiki Kaisha, Osaka, Japan

[21] Appl. No.: 250,694

[22] Filed: Sep. 28, 1988

[30] Foreign Application Priority Data

Dec. 7, 1987 [JP] Japan .................. 62-310254

[51] Int. Cl.⁵ .................................. G09G 3/36
[52] U.S. Cl. .................. 340/784; 340/805; 358/241
[58] Field of Search ............ 340/784, 765, 719, 805; 350/331 R, 334, 332; 358/236, 241

[56] References Cited

U.S. PATENT DOCUMENTS

| | | | |
|---|---|---|---|
| 4,646,074 | 2/1987 | Hashimoto | 340/765 |
| 4,799,059 | 1/1989 | Takeda et al. | 340/784 |
| 4,822,142 | 4/1989 | Yasui | 340/784 |
| 4,825,203 | 4/1989 | Takeda et al. | 340/784 |
| 4,908,609 | 3/1990 | Stroomer | 340/784 |

FOREIGN PATENT DOCUMENTS 3314778 11/1983 Fed. Rep. of Germany.
3526321 1/1986 Fed. Rep. of Germany.

*Primary Examiner*—Alvin E. Oberley
*Assistant Examiner*—M. Fatahi Yar

[57] ABSTRACT

A source electrode driving circuit for a matrix type liquid crystal display apparatus, provided respectively in the plurality of partial source electrode driving circuits, are adapted to output the sampling signal into the shift register. Sample signals are output after repeating operations of counting clock signals, the number of clock signals being equal to the number of the stages of the shift register, this number being externally set, with an inputted timing signal as the reference. Thus, the connection signal between the partial source electrode driving circuits which causes the image disturbances, is not required. This therefore provides superior display images.

11 Claims, 8 Drawing Sheets

SOURCE ELECTRODE DRIVING CIRCUIT FOR MATRIX TYPE LIQUID CRYSTAL DISPLAY APPARATUS

BACKGROUND OF THE INVENTION

The present invention generally relates to a source electrode driving circuit for a matrix type liquid crystal display apparatus.

Generally, a matrix type liquid crystal display apparatus, with a switching transistor being added to each of picture elements of the display, is used as a display apparatus for a pocket appliance or the like. This is because the display of high contrast may be provided by the switching function of the transistor even when the multiplex driving operation of multiline has been effected.

The matrix type liquid crystal display apparatus has a switching transistor 51-d built in the display picture-element 51-c of the respective intersecting points between the gate electrode 51-a and the source electrode 51-b provided on one base plate of the liquid crystal panel 51 as shown in FIG. 5. There are provided a gate electrode driving circuit 52 for adding to the respective gate electrodes 51-a scanning pulses. The circuit 52 is adapted to sequentially turn, on the switching transistors of the respective lines. There is further provided a source electrode driving circuit 53 for adding to the respective source electrodes 51-b the voltages corresponding to the varying brightness of the display of the respective picture elements. Further, a controlling circuit 54 is included for controlling the operations of the gate electrode driving circuit 52, the source electrode driving circuit 53 and so on.

The conventional source electrode driving circuit like this is shown in FIG. 6. The source electrode driving circuit is composed of a sampling hold circuit 62 which is adapted to sample and hold the voltages corresponding to the variable brightness of the respective picture elements from the display signal V. It further includes an output buffer circuit 63 which is adapted to simultaneously output into the respective source electrodes 51-b at a timing time T the, voltages $Q_1, \ldots, Q_n$ held by the sampling hold circuit 62. Still further, a shift register 61 is included which is adapted to sequentially shift, in accordance with the clock $\phi$, the sampling signals D for sequentially operating the sampling hold circuit 62 so as to input the outputs $q_1, \ldots, q_n$ into the sampling hold circuit corresponding to each column.

As shown in FIG. 7, the display signals V are normally inputted in series for every one picture element. The shift register 61 sequentially shifts the sampling signals D by the clock $\phi$ to input the outputs $q_1, \ldots, q_n$ into the sampling hold circuit corresponding to each column to sequentially cause it to effect the sampling hold operation, Thus, the voltages Vi1, ..., Vij, ..., Vin at the moments corresponding to the driving source electrodes among the display signals are held in the sampling hold circuit 62. The held voltages $Q_1, \ldots, Q_n$ are simultaneously outputted into each source electrode through the output buffer circuit 63 as shown in FIG. 6.

In this manner, the voltages corresponding to the varying brightness of the display are applied upon each of the source electrodes by the source electrode driving circuit to apply the electrodes upon the liquid crystal through the switching transistors. Therefore the display operation is effected.

The conventional source electrode driving circuit is composed of a large scale integrated circuit (LSI), as shown in FIG. 8, when the driving electrodes are many in number. In this case, as the above-described sampling hold operation is required to be continuously effected about all the LSIs, the output of the last stage of the shift register circuit 61 of each LSI is adapted to be inputted into the input terminal of the shift register circuit 61 of the next LSI. The shift register circuit 61 of each of the LSIs are adapted to effect, in all, the same operation as that of one shift register circuit, thus the continuous display is provided by the plurality of LSIs.

Generally, in the driving circuit for a matrix type liquid crystal display apparatus, digital signals are used with analog signals, with an influence problem that noises are mixed from the digital signals to the analog signals. Particularly, in the use as the display apparatus for a television image display appliance of a small type, high-frequency noises radiated into the air are mixed into the antenna of the appliance itself. This occurs in addition to the direct influences through the power wire, signal wire, so as to disturb the display images. Furthermore, as comparatively large current flows at a moment the level of the digital signal varies, linear image disturbances which are synchronized with the digital signals appear on the picture image because of the influences thereof.

As a countermeasure against the above-described problem, each digital signal whose level varies while the sampling operation is effected, is attempted to not be used as much as possible within the source electrode driving circuit. Adding a circuit for removing the high frequency component of the signal has been considered in a position as near as possible to the supply end of each digital signal.

However, when a plurality of LSIs are connected in concatenated construction in the conventional source electrode driving circuit, the connection signals between the LSIs become necessarily digital signals. The digital signal's level varies within the sampling operation period. This therefore causes such image disturbances as described hereinabove. As the LSIs are often provided normally in high density, it is often that effective noise countermeasures cannot be taken against the connection signals near the LSIs.

SUMMARY OF THE INVENTION

Accordingly, an essential object of the present invention is to provide a novel source electrode driving circuit for a matrix type liquid crystal display apparatus. In the novel source electrode driving circuit of the present invention, partial source electrode driving circuits are utilized, for example, LSIs, and are connected in a plurality of concatenated relation. Therefore, the connection signals between the partial source electrode driving circuits, which cause the image disorders, are not required. This therefore provides superior display images.

In accomplishing these and other objects, according to one preferred embodiment of the present invention, the present invention is characterized in that shift register controlling circuits, each outputting into the shift register the sampling signals, are respectively provided on each partial source electrode driving circuit after the operation for counting the clock signals by the step-number of the shift register has been repeated by the externally set number, with the inputted timing signal as reference. The source electrode driving circuit for a matrix type liquid crystal display apparatus is composed of a plurality of concatenated connection of sampling hold circuits. Each circuit samples and holds from the input display signal the voltage corresponding to the variable brightness of the display to be applied to each of the picture elements through a switching element to be added to the respective picture elements of the matrix type liquid crystal display apparatus. The device further comprises output buffer circuits each outputting to each of the switching elements, the voltage held by the sampling hold circuit. Further, the partial source electrode driving circuits each include a shift register which sequentially shifts, in accordance with the clock signal, the sampling signal for sequentially operating the sampling hold circuit.

In the above-described construction, the shift register control circuit, provided on each partial source electrode driving circuit, outputs the sampling signals into the shift register after the operation that the clock signals are counted by the number of stages of the shift register has been repeated by the externally setting number with the inputting timing signal as reference. The shift register sequentially shifts the sampling signal in accordance with the clock signal to sequentially operate the sampling hold circuit. Thus, the sampling hold circuit samples and holds, from the input display signal, the voltage corresponding to the variable brightness of the display to be applied to each picture element. The output buffer circuit outputs the held voltage into the switching element added to each picture element. Accordingly, the connection signal is not required between each partial source electrode driving circuit. Therefore, no noises are caused and thus the images are not disturbed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
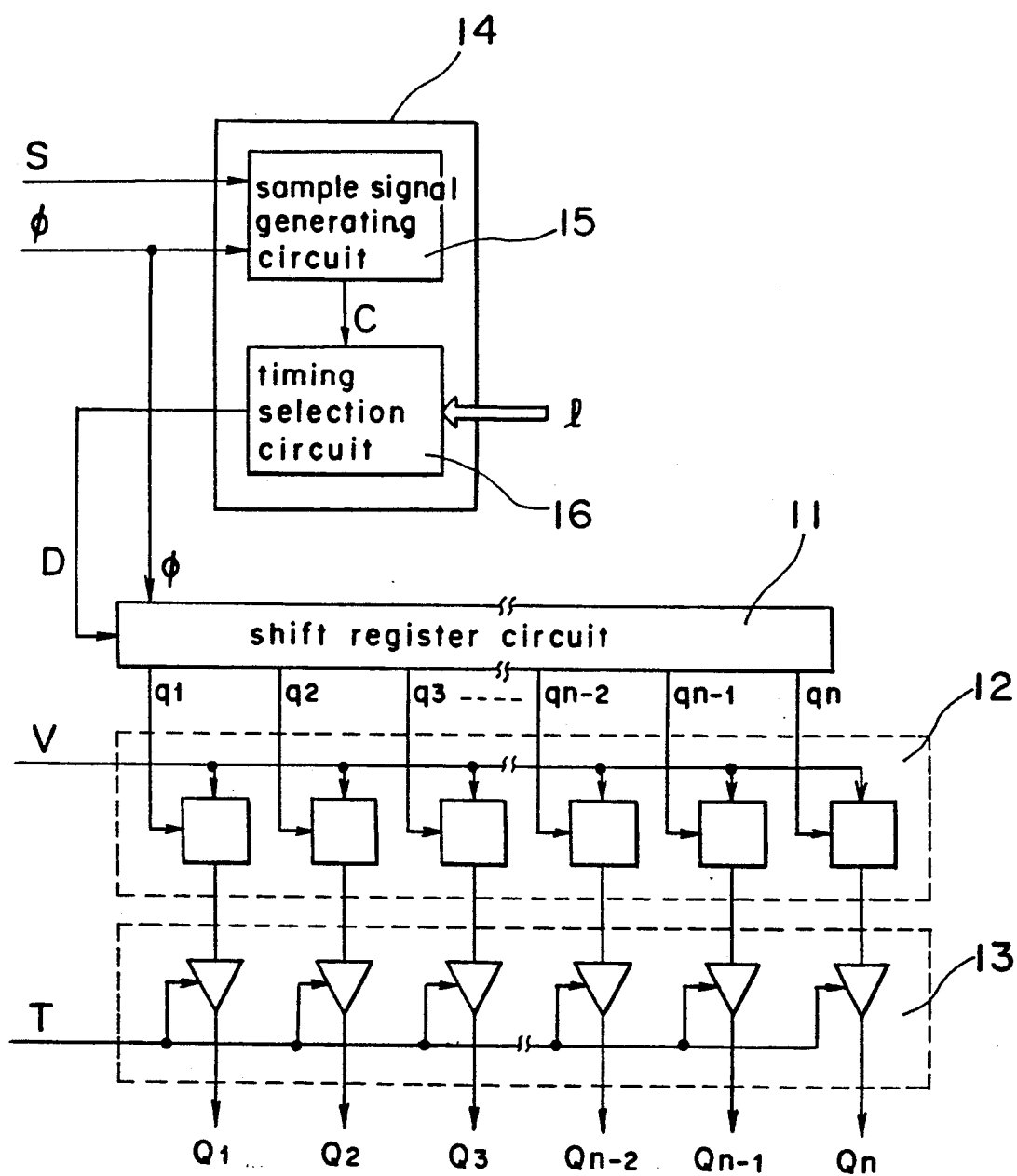
FIG. 1 is a block diagram showing the circuit construction of each LSI in one embodiment of a source electrode driving circuit of a matrix type liquid crystal display apparatus of the present invention.

Before the description of the present invention proceeds, it is to be noted that like parts are designated by like reference numerals throughout the accompanying drawings.

Referring now to the drawings, a source electrode driving circuit of the present embodiment has a plurality of concatenated LSIs, as a partial source electrode circuit. Each of the LSIs include a shift register circuit 11, a sample hold circuit 12, an output buffer circuit 13 and a shift register control circuit 14.

The shift register circuit 11, the sample and hold circuit 12, and the output buffer circuit 13 are the same in construction as in the conventional embodiment. The sampling signal D to be inputted into the shift register 11 was inputted from the external portion in the conventional embodiment. However, in the present embodiment, the sampling signal is composed by the shift register control circuit 14. The shift register control circuit 14 is composed of a sampling signal generating circuit 15 and a timing selection circuit 16 as shown in FIG. 1. The sampling signal generating circuit 15 generates one sampling signal every time the clocks $\phi$ are counted by k number, with an externally inputted timing signal S as a reference, with the number of the stages of the shift register circuit 11 assumed to be k. The timing selection circuit 16 selects the lth (l=0, 1, 2, ...) signal among a series of sampling signals made by the sampling signal generating circuit 15 through the external setting to input it into the shift register circuit 11.

Figure 2:
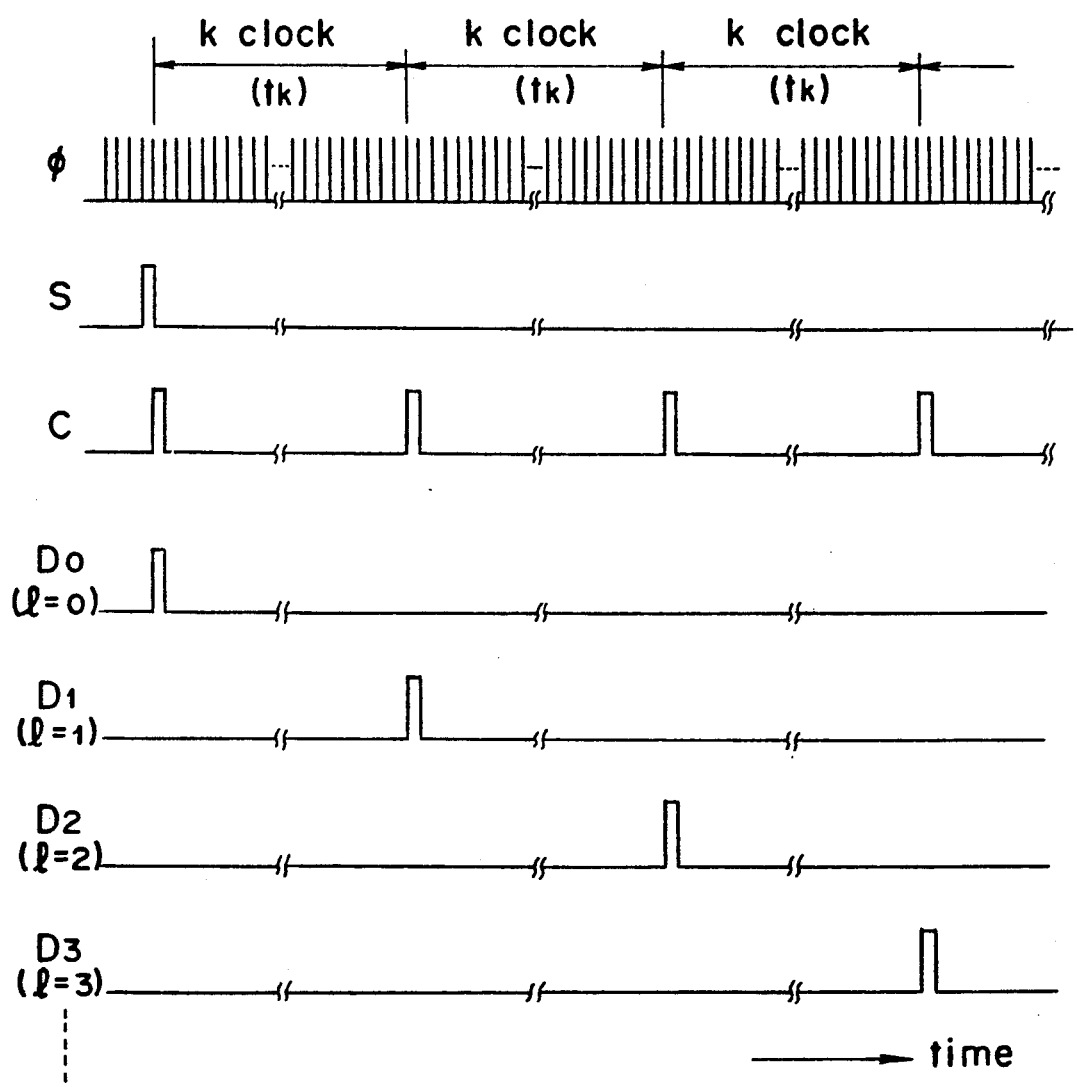
FIG. 2 is a driving waveform chart for illustrating the circuit operation in the embodiment.

A clock signal $\phi$, which is the same as the clock signal to be inputted to the shift register 11, and a timing signal S, which controls the start position of the sampling operation, are inputted, as shown in FIG. 2, into the sampling signal generating circuit 15. Then the sampling signal generating circuit 15, immediately after the timing signal S has been inputted, generates one sampling signal C at first. Thereafter it generates the sampling signal C one by one every time the clocks $\phi$ are counted as many as the stage-number k of the shift register circuit 11 so as to output the sampling signal C into the timing selection circuit 16. The interval tk between the sampling signals C is the same as the time required for the sampling signal to completely shift all the stages of the shift register circuit.

Figure 3:
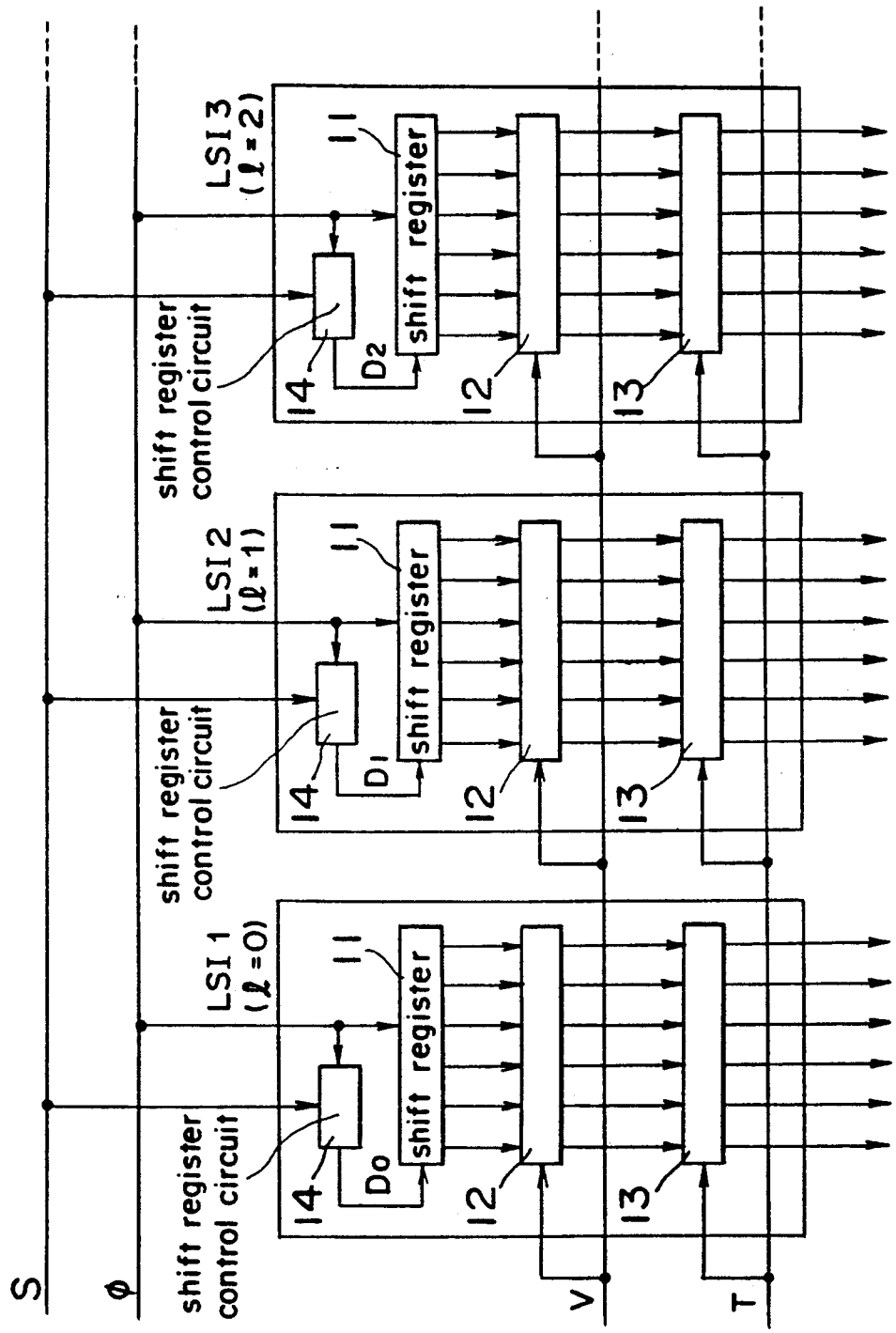
FIG. 3 is a diagram showing how a plurality of concatenated LSIs are connected in the embodiment.
Figure 8:
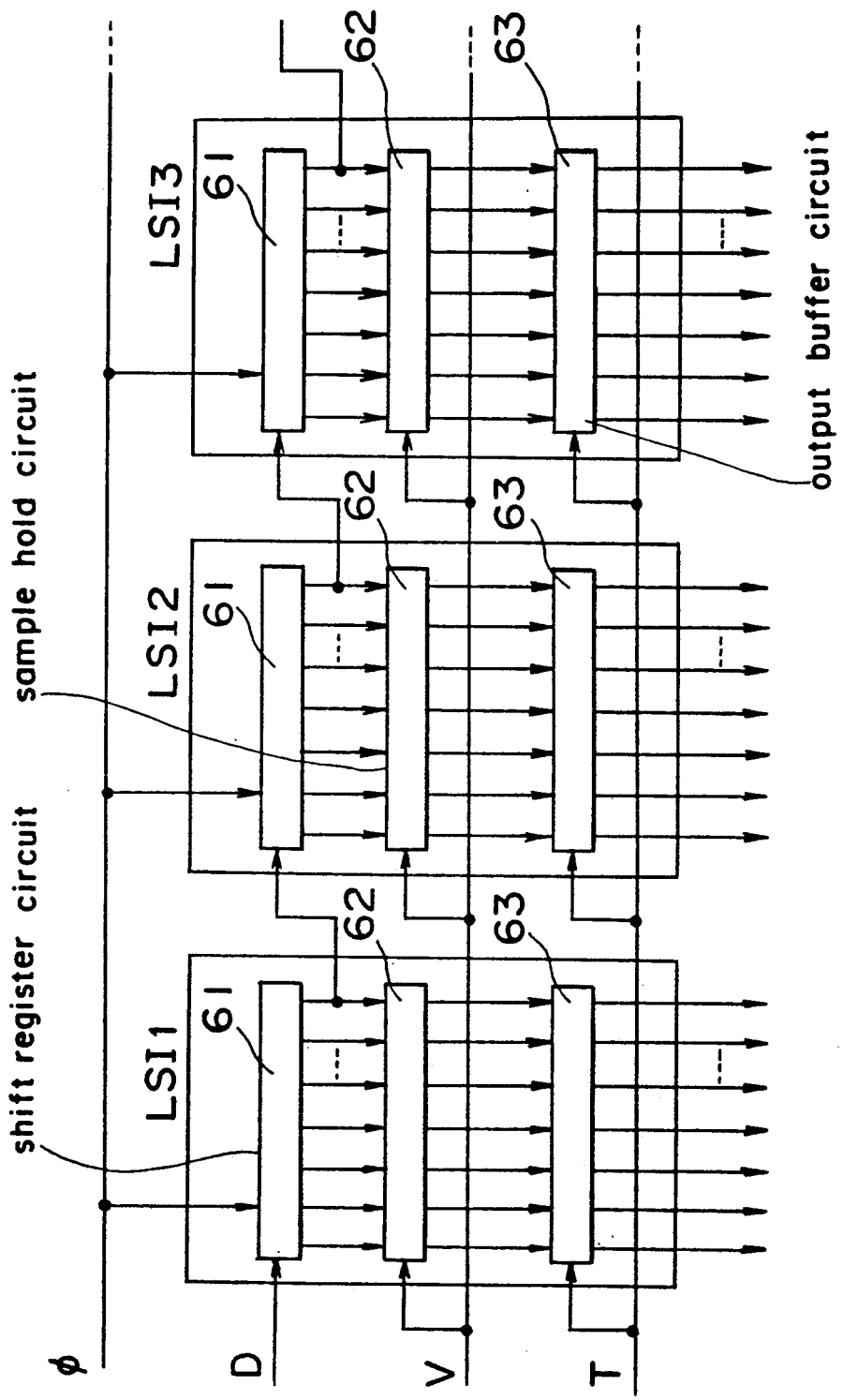
FIG. 8 is a block diagram showing the circuit construction in a case where the conventional source electrode driving circuit is composed of a plurality of concatenated LSIs.

Also, the timing selection circuit 16 takes out only the lth pulse from among a series of inputted sampling signals C to output it as a sampling signal D into the shift register circuit 11. Namely, as shown in FIG. 3, the sampling signal $D_0$ is outputted into the shift register 11 in the LSI1 (l=0). The sampling signal $D_1$ is outputted thereinto in the LSI2 (l=1). The sampling signal $D_2$ is outputted in the LSI3 (l=2). In FIG. 2, $D_0$, $D_1$, $D_2$, $D_3$ shows the cases of l=0, 1, 2, 3 respectively among the sampling signal D, with the sampling signals $D_1$, $D_2$, $D_3$ being the same in timing as the connecting signals among the respective LSIs, in a case where the number of the stages of the shift register circuits, of the respective LSIs in the conventional embodiment shown in FIG. 8, is k.

As the connection pulses among a plurality of concatenated LSIs are not required, and the sampling signals which are the same in timing as the connection signals are adapted to be caused by the respective LSIs. The display images are not disturbed by such noise, influences as shown in the conventional embodiment. Therefore, superior display images may be provided.

The timing signal S is a signal which is varied in level beyond the sampling period. Also, as the timing signal S is made outside the LSI, a circuit for noise countermeasure use may be easily added. This causes no display-image disturbances.

Figure 4:
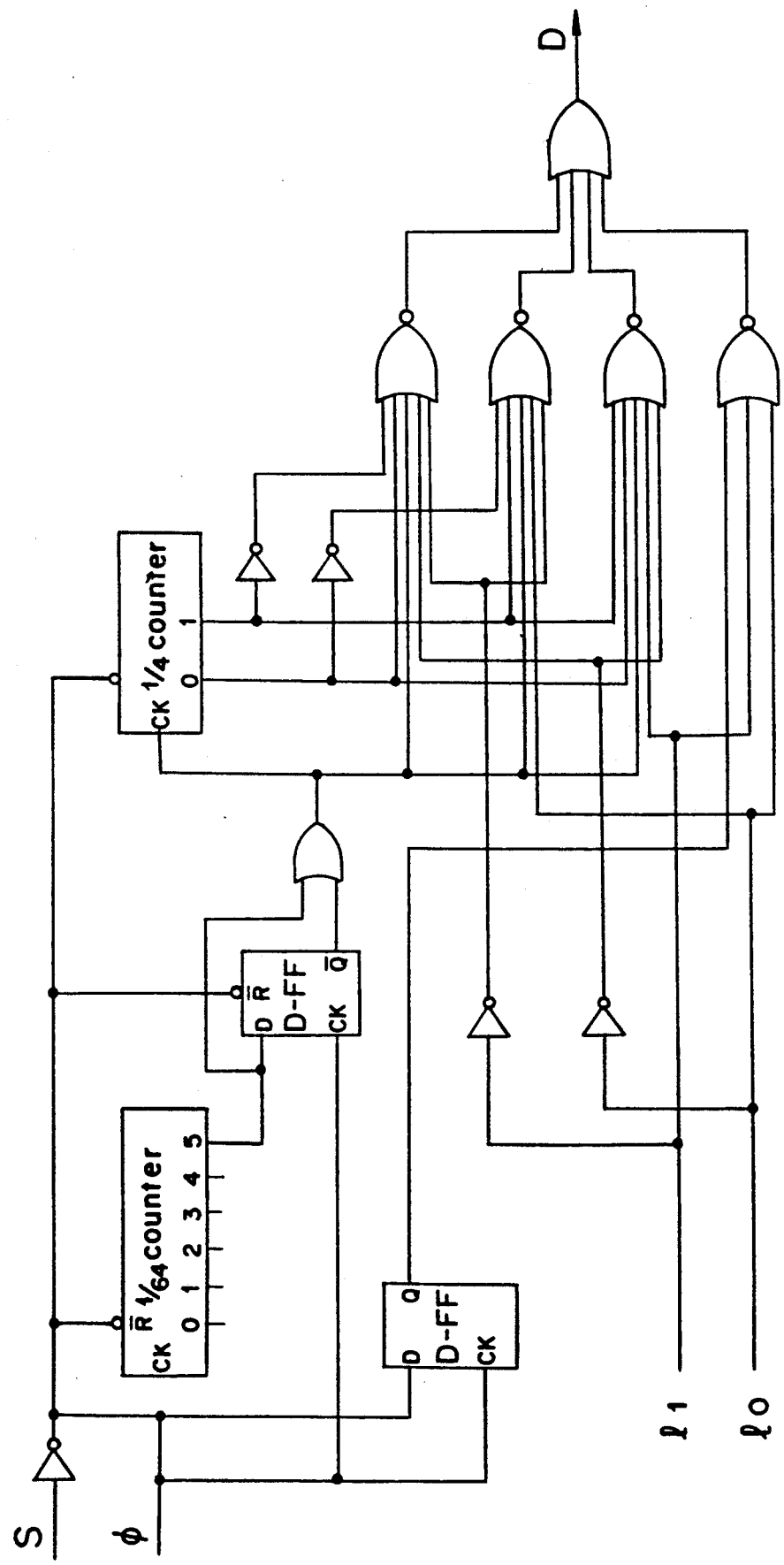
FIG. 4 is a diagram showing one embodiment of the logical circuit of a shift register control circuit in the embodiment.
Figure 5:
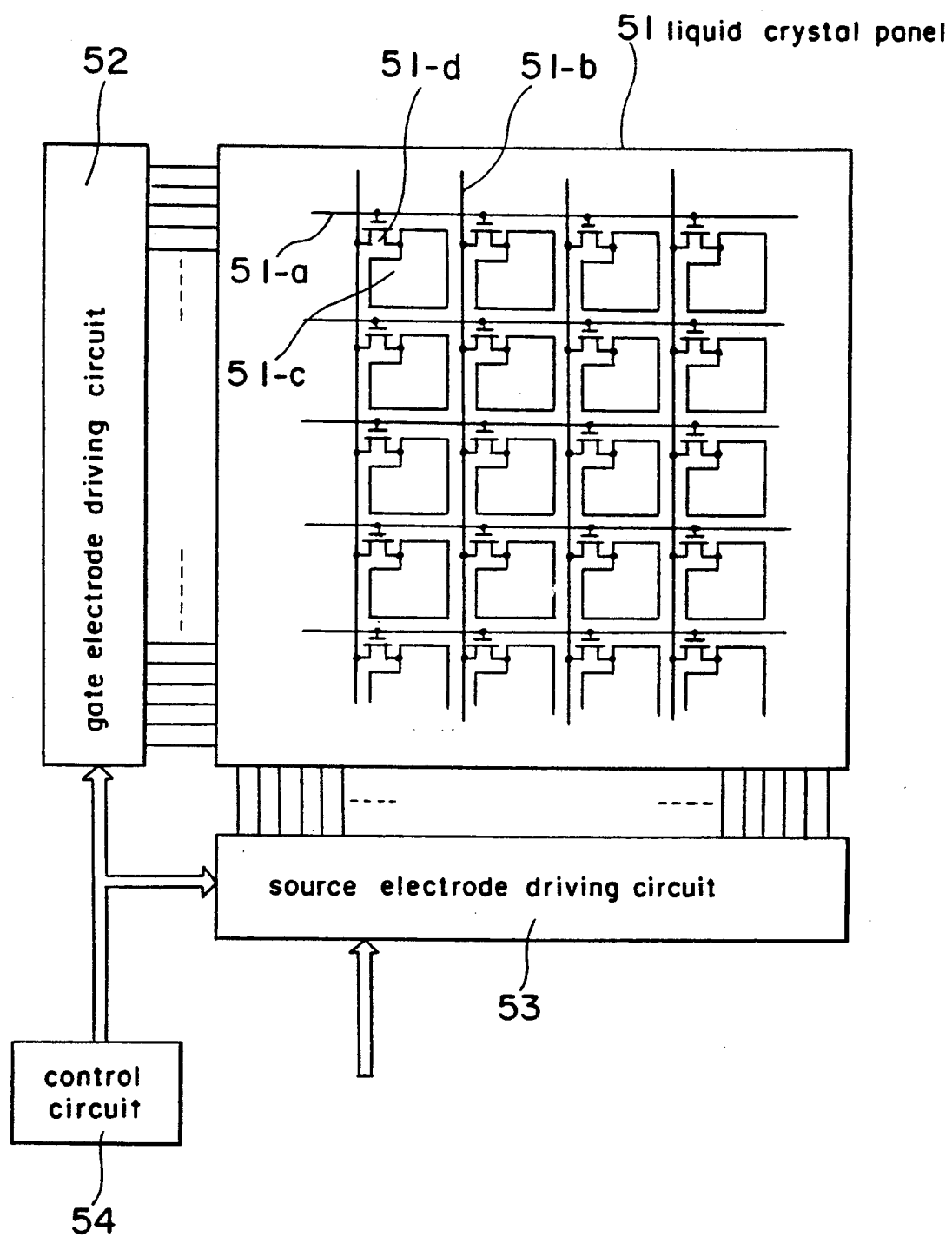
FIG. 5 is a block diagram showing the circuit construction of the general matrix type liquid crystal display apparatus.
Figure 6:
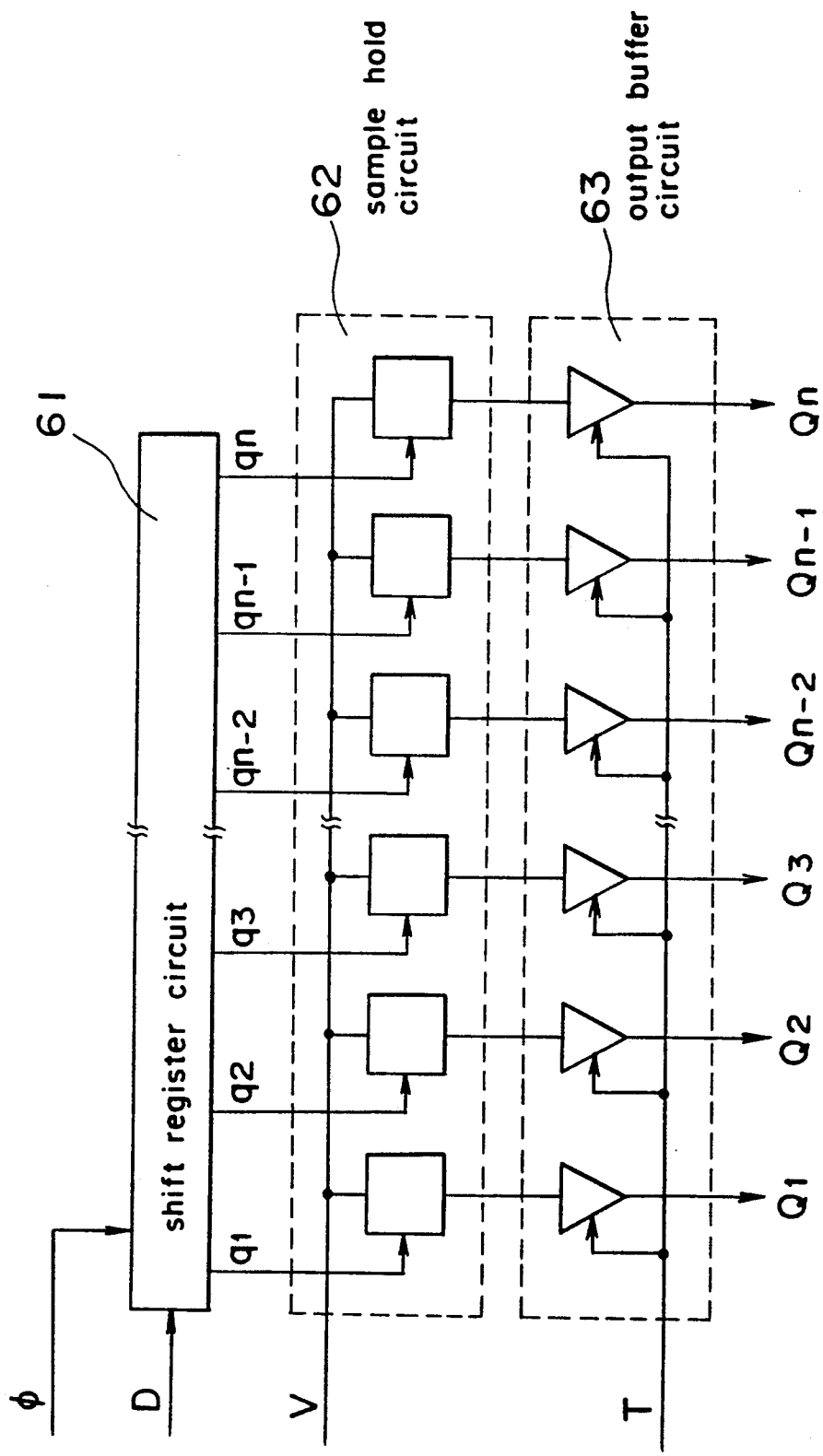
FIG. 6 is a block diagram showing the source electrode driving circuit of the conventional matrix type liquid crystal display apparatus.
Figure 7:
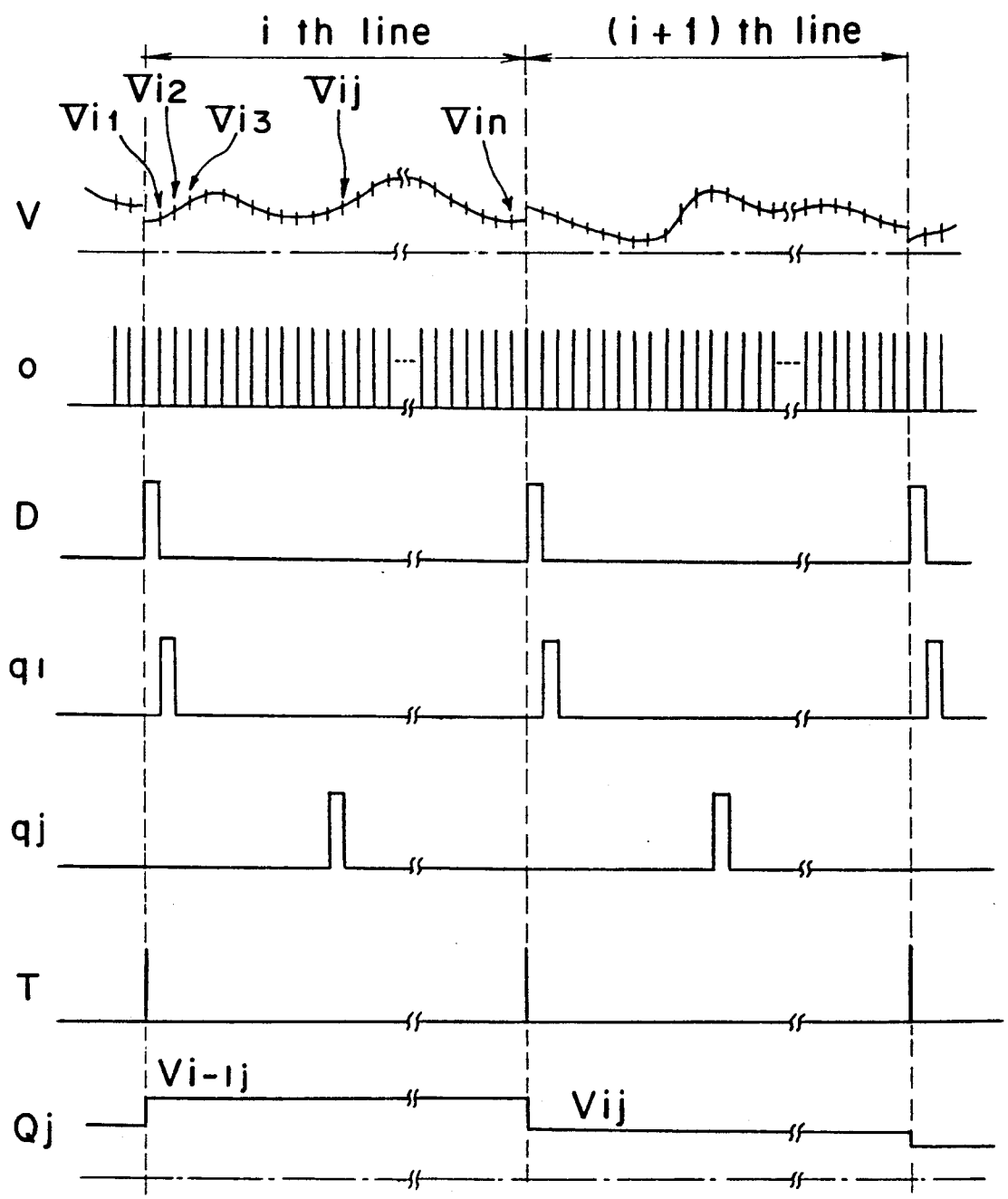
FIG. 7 is a driving wave form chart for illustrating the circuit operation in the conventional embodiment.

FIG. 4 shows one embodiment of a logical circuit of the shift register control circuit 14. The logical circuit shows a case where the k is 64, the maximum value of the setting value of the l is 3, and the setting of the l being effected by the setting signal $l_0$ and $l_1$ of 2 bits.

As is clear from the foregoing description, according to the arrangement of the present invention, the source electrode driving circuit for a matrix type liquid crystal display apparatus of the present invention has a plurality of concatenated sample and hold circuit for sample and hold, from the input display signal the voltage corresponding to the variable brightness of the display to be applied to each picture element through the switching element added to each of picture elements of a matrix type liquid crystal display apparatus. It further includes an output buffer circuit for outputting to each of the switching elements the voltage held by the sampling hold circuit. Further, a partial source electrode driving circuit is included having a shift register which sequentially shifts, in accordance with a clock signal, the sampling signal for sequentially operating the sampling hold circuit. The shift register control circuits provided respectively in the plurality of partial source electrode driving circuits are adapted to output the sampling signal into the shift register after the operation of counting the clock signals by the number of stages of the shift register has been repeated by the number to be externally set, with the inputted timing signal as the reference. Thus, the connection signal between the partial source electrode driving circuits, which causes the image disturbances, are not required. This thus provides superior display images.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A source electrode driving apparatus for a matrix type liquid crystal display apparatus including a plurality of partial source electrode drivers concatenated together, each partial source electrode driver comprising:

sample and hold means for sampling and holding, from an input display signal, a voltage corresponding to a variable brightness of the display for driving each of a plurality of corresponding picture elements, through switching elements, the picture elements corresponding to each of the partial source electrode drivers of the matrix type liquid crystal display apparatus;

output buffer means for outputting to each of the switching elements, the voltage held by the sample and hold means;

shift register means for sequentially shifting, in accordance with an input timing signal, a sampling signal for sequentially operating the sample and hold means; and shift register controlling means for outputting to the shift register means, the sampling signal upon counting of a plurality of clock signals by a predetermined set number corresponding to sequential location of the partial source electrode driver, with the inputted timing signal as reference.

2. The apparatus of claim 1, wherein the sampling signal is generated by the shift register control means, said shift register control means including a sampling signal generating means and a timing selection means, the sampling signal generating means generating one sampling signal every time clock signals are counted by k, k being equal to the number of stages of the shift register means, with an externally inputted timing signal as a reference, and the timing selection means selecting the lth (l=0, 1, 2, ...) signal among a series of sampling signals made by the sampling signal generating means through an external setting to input it into the shift register means, the lth signal corresponding to the sequential location of the partial source electrode driver.

3. The apparatus of claim 2, wherein the clock signal which is the same as the clock signal to be inputted to the shift register means, and a timing signal which controls a start position of the sampling operation are inputted into the sampling signal generating means, and the sampling signal generating means, immediately after the timing signal has been inputted, generates one sampling signal, and thereafter the sampling signals are generated one by one every time the clock signals are counted by a number equal to the number k so as to output the sampling signal into the timing selection means, the interval between the sampling signals being the same as the time required for the sampling signal to completely shift all stages of the shift register means.

4. The apparatus of claim 2, wherein the timing selection means selects only the lth pulse from among a series of inputted sampling signals to output it as the one sampling signal into the shift register means.

5. A source electrode driving apparatus including a plurality of partial source electrode drivers sequentially concatenated together, each partial source electrode driver sequentially supplying voltage, to corresponding sequential picture elements for driving a matrix type liquid crystal display apparatus, each partial source electrode driver, comprising:

sample and hold means for sequentially sampling and holding, from an input display signal, a voltage for supply to corresponding picture elements;

output buffer means, operatively connected to said sample and hold means, for sequentially outputting said voltage from said sample and hold means to sequential corresponding picture elements;

shift register means, operatively connected to said sample and hold means, for sequentially shifting, in accordance with an input timing signal, a sampling signal for sequentially operating said sample and hold means; and shift register control means, operatively connected to said shift register means, for generating a plurality of sampling signals and for selectively outputting a sampling signal to the shift register means, said sampling signal selected from said plurality of sample signals based upon the sequential location of the partial source electrode driver.

6. The source electrode driving apparatus of claim 5 wherein each shift register control means includes:

sample signal generating means for generating a plurality of sampling signals; and timing selection means, operatively connected to said sample signal generating means, for selecting and outputting a sampling signal to the shift register means, said sampling signal selected based upon the sequential location of the partial source electrode drive.

7. The source electrode driving apparatus of claim 5 wherein each of the plurality of partial source electrode drivers operate independent of the other partial source electrode drivers, operation of each shift register means being controlled by its corresponding shift register control means.

8. The source electrode driving apparatus of claim 5, wherein said output buffer means, for each of the plurality of partial source electrode drivers, sequentially outputs voltage to sequential corresponding picture elements through switching elements, one said switching element corresponding to each picture element.

9. A source electrode driving method for driving each of a plurality of partial source electrode drivers sequentially concatenated together, each partial source electrode driver sequentially supplying voltage, to corresponding sequential picture elements for driving a matrix type liquid crystal display apparatus, said method for driving each partial source electrode driver, comprising the steps of:

(a) sampling and holding, sequentially, from an input display signal, a voltage for output supply to corresponding picture elements;

(b) outputting the voltage, sequentially, to sequential corresponding picture elements;

(c) shifting, sequentially, in accordance with an input timing signal, a sampling signal for sequentially operating the sampling and holding of step (a); and (d) generating a plurality of sampling signals and selectively outputting the sampling signal of step (c), said sampling signal being selected from said plurality of sampling signals based upon the sequential location of each partial source electrode driver.

10. The source electrode driving method of claim 9 wherein each of the plurality of partial source electrode drivers operate independent of the other partial source electrode drivers, selection of each sampling signal controlled by corresponding sequential position of each partial source electrode driver.

11. The apparatus of claim 1 wherein the counting of a plurality of clock signals is repeated by the predetermined set number, with the input timing signal as a reference, to subsequently output the sampling signal.

* * * * *